United States Patent [19]

Cukrowski

[11] 3,873,099

[45] Mar. 25, 1975

[54] RECORD STABILIZER DEVICE FOR A RECORD CHANGER

[75] Inventor: Georg Cukrowski, Berlin, Germany

[73] Assignee: U.S. Philips Corporation, New York, N.Y.

[22] Filed: Nov. 9, 1973

[21] Appl. No.: 414,410

[30] Foreign Application Priority Data

Nov. 17, 1972 Germany .......................... 2256471

[52] U.S. Cl. .............................................. 274/1 R

[51] Int. Cl. .......................................... G11b 15/00

[58] Field of Search ................. 274/1 R, 10 R, 10 S

[56] References Cited

UNITED STATES PATENTS 2,947,542 8/1960 Grunwald .......................... 274/1 R 2,978,249 4/1961 Bailey et al. ...................... 274/10 R 3,095,199 6/1963 Lane ................................ 274/10 S

*Primary Examiner*—Harry N. Haroian

*Attorney, Agent, or Firm*—Frank R. Trifari

[57] ABSTRACT

A record stabilizer device for a record changer, comprising a loading arm and a vertical spindle supporting said arm, which with the aid of a support mounted on the equipment chassis is guided so as to be vertically movable, the support with the spindle and loading arm being removable from the chassis.

3 Claims, 2 Drawing Figures

PATENTED MAR 25 1975 3,873,099

RECORD STABILIZER DEVICE FOR A RECORD CHANGER

Figure 1:
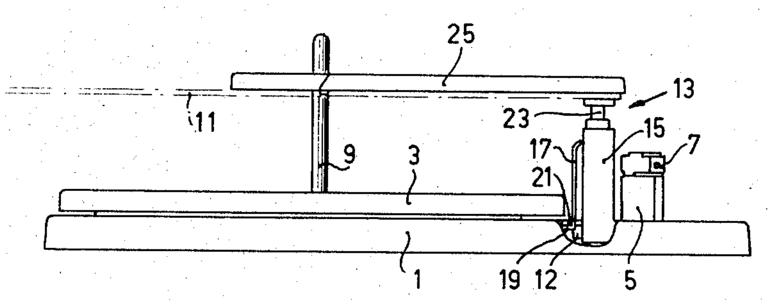

The invention relates to a record stabilizer device for a record changer, comprising a hold down arm and a vertical spindle carrying said arm, which by means of a support mounted on the equipment chassis is guided so as to be vertically movable.

Such record stabilizer devices are known; they serve to provide horizontal stabilisation for a stack of gramophone records disposed on a changer spindle. Furthermore, they can be used for initiating the stop cycle once the last record has dropped.

The known record stabilizer devices always exert a unilateral load, because the hold down arm extends from a point outside the turntable to beyond the center thereof. Therefore, a support is required which must be comparatively long so as to be able to counteract the tilting tendency of the hold down arm. The long support for the arm is in fact located above the chassis and extends upwards to closely near the arm.

When a record changer is to be used as a record player or as an automatic record player as well, the presence of the hold down arm and its support is disturbing, because these elements are not required during use as a record player. It is known to remove the hold down arm from its support when it is not to be used, but the high supporting post remains in place and thus still has a disturbing effect.

It is an object of the invention to provide a record stabilizer device whose parts which do not serve for holding down the records are completely moved out of sight and out of the way during use as a record player.

In a record stabilizer device of the type mentioned in the preamble, this is achieved in that according to the invention the support with the spindle and the hold down arm can be removed from the chassis.

Thus, the hold down arm, the spindle which supports the arm, as well as the guide for the arm and spindle can be removed during use as a record player, giving the apparatus the appearance of a record player.

In an embodiment of the invention the spindle for the hold down arm is guided in a bush which can be mounted in the chassis. The bush may be provided with a latching spring which, when the bush is fitted in the chassis, snaps behind the edge of a recess in the chassis. Preferably, this spring consists of a part which is molded on the plastic bush, which part extends downwards from the top of the bush and in the assembled condition locks behind the chassis with a tag. This embodiment is extremely simple and can be manufactured on an economic basis.

The invention is described in more detail, by way of example, with reference to an embodiment shown in the drawing.

Figure 2:
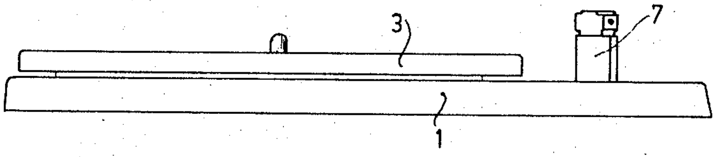

FIG. 1 shows a side view of a record changer comprising a record stabilizer device, and FIG. 2 shows the record changer with removed record stabilizer device.

A chassis 1 of a record changer carries a turntable 3. A bearing member 5 for a pickup arm 7 is disposed at the right-hand side of the chassis, which arm has been substantially omitted for clarity.

In the chassis 1 a changer spindle 9 is inserted, on which a stack of gramophone records can be arranged. For simplicity, only one record 11 is shown by a dash line.

A vertical guide 12 for a record stabilizer device 13 is situated in the chassis 1 next to the turntable 3. A bush 15 which acts as a support is fitted in the guide 12. A plastic spring 17 which is molded-on at the top of the bush 15 extends downwards along the bush and snaps behind the edge 21 of a recess in the mounting plate 1 with a tag 19.

The bush 15 guides a spindle 23 at the top of which a record hold down arm 25 is fitted.

If the record changer is to be used as a record player, the tag 19 of the plastic spring 17 is pulled towards the bush 15. The bush 15, the spindle 23 and the arm 25 can then be removed from the chassis 1 as a unit. FIG. 2 shows that after removal of the components 15, 23 and 25, which are required for holding down the records, the equipment no larger has the appearance of an apparatus which may also be used as a record changer with a record stabilizer device.

What is claimed is:

1. A record stabilizer device for a record changer, comprising a support, a vertical spindle guided in said support for vertical movement, and a hold down arm carried on said spindle, said support being adapted to be fitted in a chassis of a record changer, said support comprising latching means for retaining said support in the chassis, wherein said latching means comprises a spring adapted to snap behind an edge of a recess in the chassis.

2. A record stabilizer device as claimed in claim 1, wherein said spring is made of a plastic material, molded integrally with said support.

3. A record stabilizer device as claimed in claim 1, wherein said spring extends downward from a top end of said support, said spring comprising a tag at a lower end of the spring for locking behind the edge of the recess in the chassis.

* * * * *